2,870,103

CHLOROSULFONATED POLYETHYLENE COMPOSITION CONTAINING SULFURIZED TALL OIL

Eric O. Ridgway, Scotch Plains, and Newell A. Perry, Hamilton Square, N. J., assignors to Ridbo Laboratories, Inc., Trenton, N. J., a corporation of New Jersey No Drawing. Application July 31, 1953
Serial No. 371,788

2 Claims. (Cl. 260—23)

This invention relates to cured and uncured synthetic rubber compositions and to the preparation thereof, particularly to rubber compositions containing chlorosulfonated polyethylene.

Polyethylene is the base of the chlorosulfonated polyethylene polymers and therefore the average molecular weight of the material may vary over a wide range, depending upon the degree of polymerization of the ethylene base. In polymers of this type, the chlorine is substituted along the hydrocarbon chain and the sulfur is combined with the chlorine and attached to the chain as sulfonyl chloride ($SO_2Cl$) groups. In a typical example, there is an average of approximately one chlorine atom for every seven carbon atoms, and one sulfonyl chloride group for every 100 carbon atoms. Substitution is believed to be random.

A typical example of such a chlorosulfonated polyethylene is "Hypalon S-2," made by E. I. du Pont de Nemours and Company. This is a white spongy matted material and in the uncured form it is a rubber-like material of low strentgh which is somewhat tacky when warm.

Among the outstanding characteristics of chlorosulfonated polyethylene are its resistance to oxidation and even to ozone, low temperature flexibility, and chemical and oil resistance.

This elastomeric ethylenic polymer can be processed in conventional rubber processing equipment and can be cured to form vulcanizates. Chlorosulfonated polyethylene can be blended with other elastomers, both natural and synthetic, and it imparts its characteristic properties to such blends roughly in proportion to the amount of chlorinated polyethylene present in the blend.

Chlorosulfonated polyethylene can be cured or vulcanized with a combination of a metal oxide, a sulfur-type accelerator and an organic acid. Curing can also be accomplished with certain organic compounds in combination with acid acceptors. In either case, the active groups which provide ultimate cross linking sites are the sulfonyl chloride groups and the chlorine atoms along the hydrocarbon chain. Apparently the cure involves the reaction of these groups with metal oxides or with an organic compound such as an organic acid.

The metal oxides and salts which are particularly suitable for use as curing agents for chlorosulfonated polyethylene compounds include magnesium oxide, litharge, coprecipitated lead orthosilicate and silica gel, and tribasic lead maleate and the like. Magnesium oxide gives a very good cure, but the vulcanizates tend to have relatively high water absorption. Litharge is excellent and coprecipitated lead orthosilicate and silica gel is good.

Hypalon S-2 is a very nervy polymer and its initial viscosity is about 40 (ML-4 at 212° F.). There is a tendency for the viscosity to increase with storage. This increase is particularly aggravated by hot and humid conditions. It is therefore not advisable to store the uncured polymers for periods exceeding about six months and hot humid conditions should be avoided. It appears that the prolonged storage under such conditions results in some decomposition of the sulfonyl chloride groups and the consequent loss of sulfur dioxide. This loss if appreciable will increase the Mooney viscosity and will impair the physical properties of vulcanizates prepared from the polymer.

In view of the tendency of these polymers to increase in viscosity, in the milling of chlorosulfonated polyethylene polymers, low roll temperatures (120° F. or less) are preferably used. After the polymer has been banded, the various compounding ingredients are usually added. This can be done in any order desired, and because of the tendency of the polymer to decompose and thus gain in viscosity at high temperatures, it is preferred not to exceed a maximum temperature of 190° F. in the batch during the milling or mixing operation.

The nerviness (ability to recover quickly from strain or stretching) of the chlorosulfonated polyethylene generally requires it to be broken down or masticated on the mill before the other compounding ingredients are added. In the break-down operation, heat is inherently generated by the sheer action of the milling or mixing equipment on the polymer. Therefore, it is difficult to maintain the desired low temperatures during the milling or mixing.

An object of this invention is to reduce the inherent nerve of chlorosulfonated polyethylene polymers and compounds thereof during break-down.

Another object of this invention is to aid the compounding, processing and working by inhibiting the tendency of chlorosulfonated polyethylene polymers and compounds thereof to generate heat and to decompose during the mixing, compounding or processing.

The above purposes, and others brought out hereinafter, are accomplished by the incorporation into the elastomer of an organic agent more fully identified hereinafter, which agent is acidic and also highly compatible with the polymer. This agent, therefore, not only accomplishes the foregoing objects, but in addition assists in the curing or vulcanization of chlorosulfonated polyethylene and compounds thereof, and at the same time improves certain of the physical characteristics thereof, as will further appear.

Turning now to the multi-purpose agent of this invention, for simplicity this agent may be briefly referred to as "sulfurized tall oil." It is a reaction product of sulfur and tall oil and may be prepared in a manner more fully explained hereinafter.

As discussed above and as discussed in co-pending application Serial No. 371,792, filed July 31, 1953, the best effects of the use of the multi-purpose compounding agent of this invention are realized when the sulfurized tall oil is incorporated at the beginning or at an early stage of the mixing, i. e. at the beginning of the break-down of the rubber or immediately after it has been banded on the roll mill. However, this agent can also be advantageously incorporated at any stage of the compounding operation, for example, in the manner of adding conventional softeners and/or plasticizers.

The tall oil-sulfur reaction product is highly compatible with the chlorosulfonated polyethylene over a wide range of proportions. The quantity of sulfurized tall oil to be used will vary according to the particular formulation being prepared and the properties desired in a particular batch or in the uncured compound or in the ultimately cured product, but in general quantities ranging from at least 1% up to about 50% calculated by weight on the basis of the chlorosulfonated polyethylene present are usable. For most purposes, a range from about 2% to 15% will give good results.

The sulfurized tall oil reaction product can be incorporated directly and rapidly into the chlorosulfonated polyethylene rubbers so that good plasticization is thereby made possible. In this way, the nerve of the rubber is reduced and the dispersion of the pigments and other mixing ingredients may be greatly improved and the time for incorporation thereof is decreased. Therefore this agent allows for cooler mixing and thus inhibits the deleterious effects of thermal decomposition and the concurrent tendency to increase in viscosity during mixing.

Further, sulfurized tall oil, unlike rosin, and acidic derivatives thereof (materials which are frequently employed in compounding chlorosulfonated polyethylene), is not a tackifier and even decreases the tendency of the naturally tacky polymer to stick to the back roll of a mill. Because of the tackifying characteristic of rosin, it is usually added to the batch together with the pigments, in view of which the tendency to stick to the back roll causes poor dispersion of the pigments. Sulfurized tall oil is of especial advantage in overcoming this processing difficulty.

Sulfurized tall oil is essentially acidic, approximately 85% being a mixture of fatty and rosin acids in about equal proportions, and therefore it aids in the vulcanization or curing of chlorosulfonated polyethylene, which requires the presence of such an agent for optimum results in the cure.

The presence of sulfurized tall oil, due to its high degree of compatibility with chlorosulfonated polyethylene promotes the dispersion of fillers and other ingredients in the mixture, with the result that the desired physical characteristics of the cured compounds and uncured batch are improved.

Another great advantage of the use of sulfurized tall oil with chlorosulfonated polyethylene is its ability to extend stocks containing it, as will be illustrated in examples given hereinafter. The great compatibility of sulfurized tall oil with chlorosulfonated polyethylene, together with its ability to disperse pigments evenly and its reinforcing action make possible greatly increased pigment loading in many stocks where this is desirable. The physicals are actually improved and, at the same time, such extended stocks are easier to process. Thus greatly improved compounds can be prepared at a considerable saving in cost.

The tall-oil-sulfur reaction product contemplated for use according to the invention is prepared as follows:

First note that tall oil, which is a by-product of the manufacture of paper, comprises a mixture of fatty acids and rosin acids in roughly equal proportions, together with from about 3% to about 15% of unsaponifiables, including sterols, hydrocarbons, etc. The tall oil employed may be the crude by-product or may be a refined product, the latter being advantageous where white or light shades of colors are desired in the final vulcanized rubber or rubber product being produced.

The tall oil is heated together with from about 1% to 25% of sulfur, most advantageously from about 6% to 10%, the temperature of heating being between about 300° F. and 400° F., preferably in the neighborhood of 310° F. to 330° F. The time of heating should be continued until no free sulfur remains.

The desirable characteristics of the sulfurized product are apparently due to the content of fatty acids and rosin acids in the material employed for sulfurization. Therefore, it is advantageous in the heating of the tall oil with the sulfur to avoid severe time-temperature relationships (especially excessively high temperatures), because such severe treatment tends to decarboxylate rosin acids present and excessively increase the hydrocarbon or unsaponifiable content.

The sulfurized tall oil product comprises a homogeneous, highly viscous mass at room temperatures; and it is of a stickly consistency having a high affinity for rubber.

EXAMPLES

There are presented just below a number of examples, most of which are given in comparative groups or pairs, so as to illustrate various of the features and advantages hereinbefore discussed.

To simplify the presentation of the examples and to enable tabulation of the data, there is given just below a statement fully identifying treatment conditions, testing results, and materials used in the examples and referred to therein only briefly or by identifying letters or figures for simplicity.

Considering the first of the materials used in the examples, note the following:

STO—wherever this symbol appears in the examples, sulfurized tall oil is meant. In all of the examples the sulfurized tall oil was prepared in the following manner: Crude tall oil was heated at a temperature of about 320° F. with about 8 to 10% of sulfur for about 3 to 4 hours.

Hypalon S-2—chlorosulfonated polyethylene made by E. I. du Pont de Nemours and Co., Inc.

ELCM—extra light calcined magnesia.

Agerite resin D—a polymerized trimethyl dihydroquinoline made by R. T. Vanderbult Co.

Cumar P10—a polymer of indene-cumarone and associated coal tar compounds made by the Barrett Division of Allied Chemical and Dye Corporation.

Conditions of treatment, test results, etc. are identified as follows:

All cures were at about 287° F. and the time thereof is indicated in minutes.

All modulus and tensile figures are given in pounds per square inch.

All hardness figures are determined on the Shore A scale.

The Mooney viscosity figures are identified by "ML-4," which means that they were determined by using the large rotor on the Mooney testing machine for 4 minutes at 212° F.

The Mooney scorch figures given in the examples represent time in minutes required to raise the viscosity 5 points above the lowest point of viscosity reached during the test. In all cases Mooney scorch determinations were made at 250° F. To be particularly noted here is that in Examples 8 and 9 the scorch readings were taken after a 20 point rise.

Where relative viscosity values are given, these were observed during the Mooney scorch tests.

In all examples the parts indicated are parts by weight.

*Examples 1 to 3*

The following examples illustrate the use of sulfurized tall oil in chlorosulfonated polyethylene, each example of this group being worked on a laboratory roll mill. Although the elastomer did not have very high viscosity, nevertheless it was highly nervy and therefore difficult to work with the usual compounding ingredients. Viscosity determinations indicated the following:

| Recipe | Example 1 | Example 2 | Example 3 |
| --- | --- | --- | --- |
| Hypalon S-2 | along | plus 10 parts STO. | plus 30 parts STO. |
| ML-4 | 34½ | 25½ | 17. |

The sulfurized tall oil was highly compatible with the elastomer and incorporated rapidly notwithstanding the high nerve of the elastomer. The nervy characteristic was diminished by the use of the sulfurized tall oil approximately in proportion to the decrease in viscosity indicated in the above table.

Examples 4 and 5

These examples illustrate the reinforcing effect of sulfurized tall oil when used in chlorosulfonated polyethylene compounds.

| Recipe | Example 4 | Example 5 |
|---|---|---|
| | Parts | Parts |
| Hypalon S-2 | 100 | 100 |
| F. F. Wood rosin | 6 | |
| STO | | 10 |
| Barytes | 60 | 60 |
| Titanium dioxide | 20 | 20 |
| ECLM | 20 | 20 |
| Agerite resin D | 2 | 2 |
| Dibutyl phthalate | 10 | 5 |
| Cumar P10 | 10 | 5 |
| Totals | 228 | 222 |

HARDNESS

| Physical Tests | Example 4 | Example 5 |
|---|---|---|
| 15 | | 64 |
| 30 | | 66 |
| 45 | 59 | 67 |
| 60 | 60 | 68 |

MODULUS AT 200%

| | | |
|---|---|---|
| 15 | | 1,140 |
| 30 | | 1,160 |
| 45 | 800 | 1,130 |
| 60 | 875 | 1,130 |

TENSILE STRENGTH

| | | |
|---|---|---|
| 15 | | 1,340 |
| 30 | | 1,450 |
| 45 | 900 | 1,340 |
| 60 | 940 | 1,360 |

PERCENT ELONGATION

| | | |
|---|---|---|
| 15 | | 300 |
| 30 | | 310 |
| 45 | 260 | 310 |
| 60 | 250 | 300 |

The cures of Example 4 were porous and pimply; on the other hand, the cures of Example 5, containing the sulfurized tall oil, were smooth.

Particularly to be noted are the considerable improvements of all the physicals in Example 5. These illustrate the accelerating effect, as well as the reinforcement of sulfurized tall oil.

Examples 6 and 7

These examples further illustrate the improvement in physicals when sulfurized tall oil is incorporated in chlorosulfonated polyethylene stocks. The reinforcing effect of the sulfurized tall oil is still evident even though there are 10 less parts of extra light calcined magnesia in Example 7 than in the control, Example 6.

| Recipe | Example 6 | Example 7 |
|---|---|---|
| | Parts | Parts |
| Hypalon S-2 | 100 | 100 |
| FF Wood rosin | 6 | |
| STO | | 10 |
| Barytes | 60 | 60 |
| Titanium dioxide | 20 | 20 |
| ELCM | 20 | 10 |
| Agerite resin D | 2 | 2 |
| Dibutyl phthalate | 10 | 5 |
| Cumar P10 | 10 | 2.5 |
| Totals | 228 | 209.5 |
| Mooney scorch _____ minutes | 4¾ | 8 |
| Relative viscosity | 11½ | 14½ |

The reduction of the extra light calcined magnesia, which is magnesium oxide of large surface area, was probably responsible for the less scorchy (thus safer) stock of Example 7.

HARDNESS

| | Example 6 | Example 7 |
|---|---|---|
| 15 | | 62 |
| 30 | | 65 |
| 45 | | 66 |
| 60 | 59 | 66 |
| | 60 | |

MODULUS AT 200%

| | | |
|---|---|---|
| 15 | | 900 |
| 30 | | 895 |
| 45 | | 1,000 |
| 60 | 800 | 1,025 |
| | 875 | |

MODULUS AT 400%

| | | |
|---|---|---|
| 15 | | |
| 30 | | 1,350 |

TENSILE STRENGTH

| | | |
|---|---|---|
| 15 | | 1,200 |
| 30 | | 1,350 |
| 45 | | 1,430 |
| 60 | 900 | 1,450 |
| | 940 | |

PERCENT ELONGATION

| | | |
|---|---|---|
| 15 | | 330 |
| 30 | | 400 |
| 45 | | 360 |
| 60 | 260 | 370 |
| | 250 | |

To be noted is the great improvement in physicals in Example 7 where sulfurized tall oil is used, as compared to the control, Example 6.

Examples 8 and 9

These examples illustrate the effect of using sulfurized tall oil in a chlorosulfonated polyethylene stock which is heavily loaded, i. e. a considerable increase in pigments (barytes and titanium dioxide) in Example 9 over the control, Example 8.

| Recipe | Example 8 | Example 9 |
|---|---|---|
| | Parts | Parts |
| Hypalon S-2 | 100 | 100 |
| FF Wood rosin | 6 | |
| STO | | 10 |
| Barytes | 60 | 100 |
| Titanium dioxide | 20 | 40 |
| ELCM | 20 | 5 |
| Agerite resin D | 2 | 2 |
| Dibutyl phthalate | 10 | 5 |
| Cumar P10 | 10 | 5 |
| Totals | 228 | 267 |
| Mooney scorch | 4¾ | 11¾ |
| Relative viscosity | 11½ | 13½ |
| Mooney scorch after 20 point rise | 7¾ | 26½ |

Note the considerable improvement in the scorch and viscosity values in spite of the great increase in pigment loading in Example 9 over the control, Example 8.

HARDNESS

|  | Example 8 | Example 9 |
|---|---|---|
| 15 |  | 63 |
| 30 |  | 67 |
| 45 | 59 | 69 |
| 60 | 60 | 69 |

MODULUS AT 200%

|  | Example 8 | Example 9 |
|---|---|---|
| 15 |  | 600 |
| 30 |  | 640 |
| 45 | 800 | 730 |
| 60 | 875 | 800 |

MODULUS AT 400%

|  | Example 8 | Example 9 |
|---|---|---|
| 30 |  | 800 |

TENSILE STRENGTH

|  | Example 8 | Example 9 |
|---|---|---|
| 15 |  | 680 |
| 30 |  | 800 |
| 45 | 900 | 875 |
| 60 | 940 | 940 |

PERCENT ELONGATION

|  | Example 8 | Example 9 |
|---|---|---|
| 15 |  | 380 |
| 30 |  | 400 |
| 45 | 260 | 390 |
| 60 | 250 | 340 |

Particularly to be noted are the evenness of cure, increase in hardness and elongation, and other good physicals of Example 9 wherein sulfurized tall oil was used, when compared to the control, Example 8. This is particularly significant considering the heavy pigment load of Example 9, which actually extends the basic recipe of Example 8 by over 17%. Thus a considerable saving in cost can be realized while, at the same time, a much superior stock is produced when sulfurized tall oil is used with chlorosulfonated polyethylene, and compounds containing the same.

We claim:

1. A rubber composition adapted to be worked to a desired shape comprising chlorosulfonated polyethylene and the thermal reaction product of tall oil and sulfur, the sulfur in said reaction product being about 1% to 25% by weight based on the weight of the tall oil and the amount of said reaction product being from about 1% to 50% by weight of the chlorosulfonated polyethylene.

2. A vulcanizate comprising chlorosulfonated polyethylene and the thermal reaction product of tall oil and sulfur, the sulfur in said reaction product being about 1% to 25% by weight of the tall oil and the amount of said reaction product being from about 2% to 15% by weight of the chlorosulfonated polyethylene in the vulcanizate.

References Cited in the file of this patent

UNITED STATES PATENTS

| 2,480,478 | Kalman | Aug. 30, 1949 |
| 2,534,078 | Strain | Dec. 12, 1950 |

FOREIGN PATENTS

| 618,592 | Germany | Sept. 11, 1935 |

OTHER REFERENCES

"Vinsol," Ad., Ind. Eng. Chem., 39, page 52 A, November 1947.